United States Patent [19]

Krasik

[11] Patent Number: 4,750,094

[45] Date of Patent: Jun. 7, 1988

[54] LOW COST APPARATUS FOR SIMULATING AN ALARM SYSTEM ACTUATING COMPONENT

[76] Inventor: Michael H. Krasik, 1849 N. 53rd St., Seattle, Wash. 98103

[21] Appl. No.: 95,179

[22] Filed: Sep. 10, 1987

Related U.S. Application Data

[62] Division of Ser. No. 900,503, Aug. 26, 1986, Pat. No. 4,707,575.

[51] Int. Cl.⁴ ........................ F21V 9/16; F16H 21/14; H02B 1/08; H02G 3/14

[52] U.S. Cl. .......................................... 362/95; 74/66; 220/241; 362/157

[58] Field of Search .................... 200/15, 52 R, 43.08, 200/43.16, 331, 60, 61.64; 174/66, 67; 307/132 E, 140, 119; 340/543, 310 R; 220/241, 242; 362/95, 157, 190, 191

[56] References Cited

U.S. PATENT DOCUMENTS

| | | | |
|---|---|---|---|
| 2,428,167 | 9/1947 | Linton | 220/241 |
| 2,575,820 | 11/1951 | Linton | 220/241 |
| 3,739,226 | 6/1973 | Seiter et al. | 174/66 |
| 4,090,046 | 5/1978 | Faust et al. | 200/15 X |
| 4,282,591 | 8/1981 | Andreuccetti | 174/66 X |
| 4,540,984 | 9/1985 | Waldman | 307/132 E X |
| 4,654,745 | 3/1987 | Corby | 361/171 |

*Primary Examiner*—J. R. Scott

*Attorney, Agent, or Firm*—Seed and Berry

[57] ABSTRACT

A self-contained device which simulates the appearance of an operating alarm system actuating component is disclosed. The device has a face plate similar to face plates for key operated or switch operated alarm systems. The face plate also has a light mounted thereon and a self-contained power source for illuminating the light. The device can be mounted to the exterior surface of a building or doorjamb and actuated, such as by a key operated switch, so that the device simulates the appearance of an operating actuating component for a real alarm system.

2 Claims, 2 Drawing Sheets

LOW COST APPARATUS FOR SIMULATING AN ALARM SYSTEM ACTUATING COMPONENT

RELATED APPLICATIONS

This application is a division of my U.S. patent application Ser. No. 900,503 filed 8/26,86, now U.S. Pat. No. 4,707,575 titled SPRING SWITCH FOR ELECTRONIC CIRCUITS.

TECHNICAL FIELD

This invention relates to electronic home alarm systems.

BACKGROUND ART

Electronic home security systems are available for safeguarding and securing the perimeter of a home or building. Such systems typically include a means for arming the system and a plurality of sensors which detect the opening of a window, door, etc. or a movement within a prescribed area.

In many systems, the means for arming the system comprise a rectangular switch plate which is located on an external door jamb. The rectangular switch plate often has a blinking, light emitting diode or other visual indicator to signify an armed condition of the system. The visual indicator and system can be actuated by an electronic keypad or a key switch. In many systems, a key actuated switch plate has acquired a somewhat standardized appearance. The external appearance of such a key operated switch plate can, therefore, in and of itself act as a deterrent.

DISCLOSURE OF THE INVENTION

A spring switch is particularly suited for use in in a simulated alarm system having a relatively shallow mounting plate in which an electronic flasher circuit is contained. A relatively low-clearance key-operated cam is mounted to the plate, and a DIP integrated circuit having a coil spring assembled is mounted to the inside of the switch plate. Batteries can be positioned within the housing and are grounded to the switch plate. The positive terminal of the batteries can be connected to the DIP flasher integrated circuit, which operates a light-emitting diode. The light-emitting diode penetrates through the switch plate.

Rotation of the key causes the cam to contact a portion of the spring against the switch plate, thus establishing electrical continuity in the circuit and operating the light-emitting diode. Because the circuit elements can be mounted directly to the switch plate without a printed circuit board, manufacturing costs are substantially reduced. Furthermore, placement of the spring-/integrated circuit assembly is not highly critical for proper positioning of the portion of the spring which interacts with the cam, thus further reducing production costs. The entire circuit can be easily contained in a switch plate having a depth of approximately one-half inch or less, which simulates the functional appearance of real alarm system switch plates.

BEST MODE FOR CARRYING OUT THE INVENTION

Figure 1:
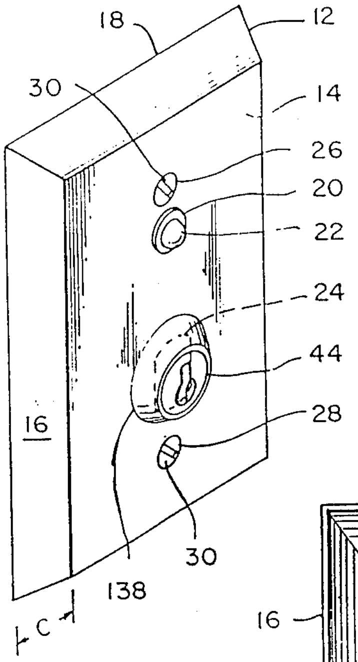
FIG. 1 is an isometric view of a simulated alarm system having an electrical circuit which employs the switch of the present invention as an integral part thereof.

A simulated alarm system, utilizing a switch of the present invention, is generally indicated at reference numeral 10. The simulated alarm system has a stainless steel mounting plate 12 having a face plate 14 and peripheral sidewalls 16, 18 which are connected to the face plate 14 at an angle so as to give the mounting plate 12 a depth d of approximately one-half inch.

Figure 7:
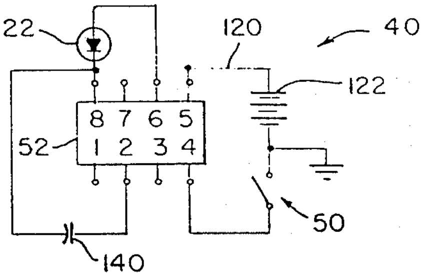
FIG. 7 is an electrical schematic of the simulated alarm system shown in FIGS. 1 and 2.

The face plate 14 has an LED aperture 20 which receives an LED 22. The face plate also has a D or double D-shaped aperture 24 which receives a key lock cylinder housing 26, best seen in FIG. 2, for preventing rotation of the cylinder housing relative to the mounting plate 12. The face plate also has fastener apertures 28 for threaded fasteners 30 for fastening the simulated alarm system 10 to a door frame or other external structure. The simulated alarm system has a flasher circuit, generally indicated at reference numeral 40, which causes the LED 22 to blink in a fashion similar to that of some conventional alarm systems when a key (not shown) is inserted in a lock cylinder 44, which is rotatably mounted in the key lock cylinder housing 26, and rotated. A schematic of electronic flasher circuit 40 is shown in FIG. 7.

Figure 3:
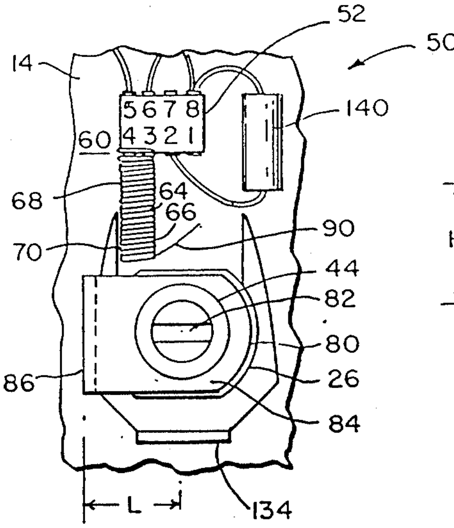
FIG. 3 is an enlarged fragmentary view of the cam mechanism and integrated circuit/spring combination shown in FIG. 2.
Figure 4:
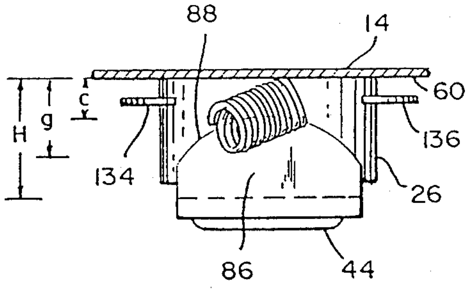
FIG. 4 is an enlarged sectional elevational view taken generally along line 4—4 of FIG. 2.

In order to dissuade unauthorized persons from entering a dwelling or other building displaying the simulated alarm system 10, it is imperative that the simulated alarm system simulate the mechanial appearance of a generic class of alarm system mounting plates. It has been found that the depth d of the mounting plate 12 should not exceed approximately one-half inch in order for the illusion to be successfully conveyed. Thus, it is not possible to use prior art self-contained key switches which have depths in excess of approximately one inch. For this reason, and other reasons which will be more fully described below, the electronic flasher circuit 40 is supplied with an integral spring switch 50, which is best shown in FIG. 3.

The intergral spring switch 50 includes a dual in-line package (DIP), integrated circuit (IC) 52 which is an LM3909 LED flasher/oscillator manufactured by National Semiconductor Corporation. The integrated circuit 52 is shown mounted topside-down to the inside surface 60 of the face plate 14. The manufacturer's pin numbers are shown designated as numbers 1 through 8 on the integrated circuit 52.

The integrated circuit 52 forms an electrically insulative support for an electrically conductive coil spring 64. The coil spring has a plurality of adjacent turns 66 which form a cylindrical helix. A fixed end 68 of the coil spring 64 is electrically and physically connected to pins 4 and 3 of the integrated circuit 52 by a method which will be more fully described below.

The fixed end 68 is electrically insulated from the electrically conductive inside surface 60 of the face plate 14 by the body of the dual in-line package of the integrated circuit 52. The axis of the coil spring is maintained in a substantially parallel relationship to the electrically conductive inside surface 60 by the DIP body 52 so that an air gap is formed between the surface and the exterior of the spring. The coil spring 64 is preferably manufactured from 0.015 inch diameter music wire which is zinc plated for oxidation resistance. Other platings or spring materials may be used, depending on the desired electrical and mechanical characteristics of the switch contact area which is more fully described below. It has been found that stainless steel is a suitable substitute material for this purpose. If stainless steel is used, it is preferred to spot-weld the connection.

Figure 2:
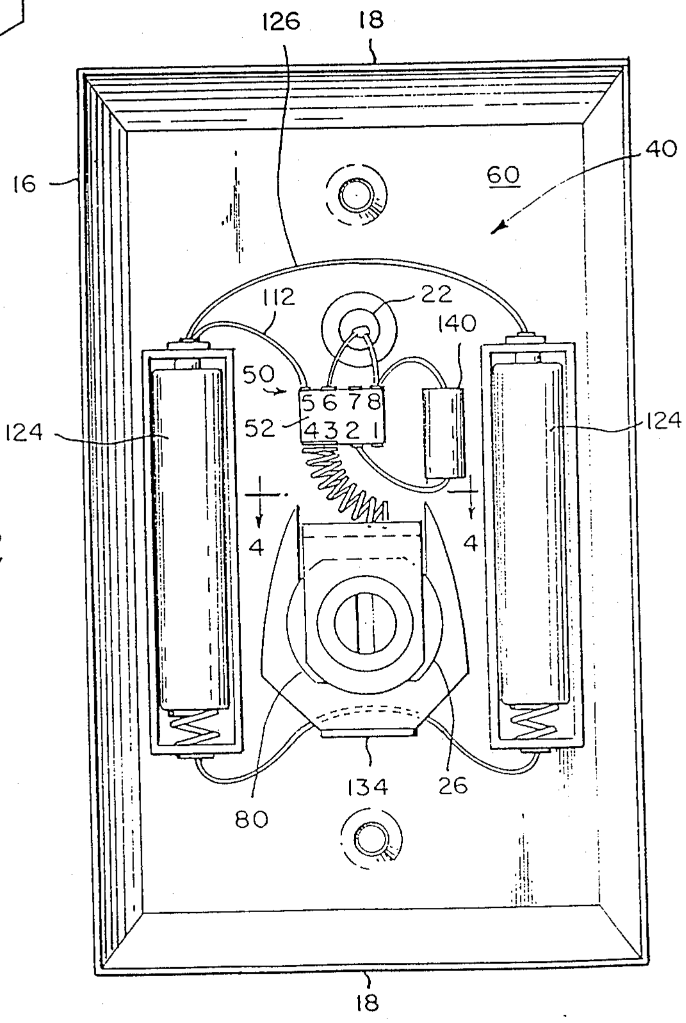
FIG. 2 is a rear elevational view of the simulated alarm system shown in FIG. 1.

The coil spring 64 has a free end 70 which is positioned so that rotation of a cam 80 about a cam axis 82 displaces the coil spring from the rest position, shown in FIG. 3, to a displaced position, shown in FIG. 2.

The cam 80 has a first portion 84 which is connected for rotation with the lock cylinder 44. One end of the first portion 84 has a second portion 86 which extends perpendicularly from the inside portion and towards the electrically conductive inside surface 60 of the face plate 14. The first portion has a length L (see FIG. 3) of approximately 0.500 inch between the cam axis 82 and the second portion 86. The second portion has a height H of approximately 0.250 inch. The depth of the key lock cylinder housing 26 and lock cylinder 44 from the face place 14 is less than one-half inch.

A suitable key lock having the required shallow depth is Model No. 344 FCQ manufactured by ESP Corp., Leominster, Mass. The first portion 84 of the cam 80 is substantially parallel to the face plate 14 so that the depth of the entire assembly is less than the depth d of the mounting plate 12.

The second portion 86 of the cam 80 has a convexly curved cam surface 88 which is spaced from the electrically conductive inside surface 60 of the face plate 14 so as to provide a moderate compressive and relatively substantial translative force to the free end 70 of the coil spring 64. Rotation of the cam to the second position wipes the free end of the spring against the electrically conductive inside surface 60 and positions the free end thereagainst. This occurs when the lock cylinder 44 is rotated to position the cam 80, as shown in FIG. 2. The wiping action leaves a wear path 90 in the electrically conductive inside surface 60, which removes oxidation and other surface contaminants from the surface, which would otherwise decrease electrical conductivity between the coil spring 64 and the electrically conductive inside surface 60.

The coil spring 64 has an outside diameter of approximately 0.160 inch. The closest distance c between the electrically conductive inside surface 60 and the cam surface 88 is approximately 0.060 inch. The greatest distance g between the cam surface 88 and the electrically conductive inside surface 60 is approximately 0.300 inch. The radius of curvature of the cam surface 88 is approximately 11/32 inch.

It has been found that a cam surface having a separation distance and shape as described above sufficiently compresses the spring, without binding the spring against the electrically conductive inside surface 60, and translates the spring to provide the desired wiping and contacting action as described above.

If the closest distance c between the cam surface and the electrically conductive inside surface 60 is too small, then the spring will be insufficiently compressed to provide the wiping action. If the closest distance c is too large, the spring will jam under the rotating cam or miss the cam altogether. If the greatest distance g is too small, then the spring will be excessively translated and insufficiently compressed for good contact. Thus, when increasing or decreasing the scale of the present invention, it is desirable to approximately maintain the above-described relationships to provide the correct wiping action and contact pressure.

Figure 5:
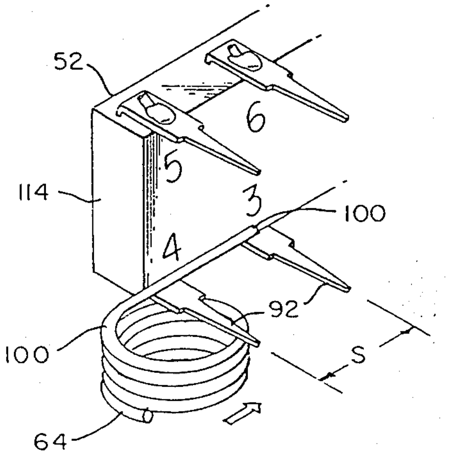
FIG. 5 is an enlarged isometric view of a first assembly step of the present invention.
Figure 6:
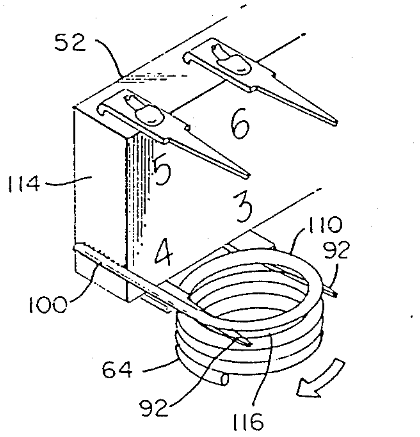
FIG. 6 is an enlarged isometric view of a final assembly step of the method shown in FIG. 5.

FIGS. 5 and 6 illustrate a preferred method for positioning and connecting the spring 64 to the legs 92 of the DIP integrated circuit 52. The typical separation distance s of legs on this dual in-line package is approximately 0.100 inch. The outside diameter of the coil spring 64 (0.160 inch) has been selected so that adjacent legs can be positioned between adjacent coil turns of the spring.

The coil spring 64 has a tangential stop arm 100 which extends from the last turn 110 on the fixed end 68 of the spring coil 64. In the application shown, the helix of the coil spring has a clockwise or "left-hand" curl for a purpose which will be more fully understood later.

To assemble the coil spring 64 with the DIP IC 52, the tangential stop arm 100 is first preferably positioned as shown in FIG. 5 so that the legs 92, corresponding to pins 4 and 3 of the DIP integrated circuit 52, are between the tangential stop arm 100 and the last coil turn 110 of the coil spring 64. The tangential stop arm is then preferably slid behind the pins by guiding the stop arm against the bottom 112 of the integrated circuit 52, as shown by the arrow in the figure.

As shown in FIG. 6, after the last coil turn 110 is seated against leg 92 of pin 4 by fully translating the coil spring 64 to the right, as shown by the arrow in FIG. 5, the coil spring is then rotated in the direction of the helix, i.e., clockise, as shown by the arrows in FIG. 6, so that the tangential stop arm 100 abuts against a stop surface 114 formed by the side of the DIP integrated circuit 52.

It is observed that the legs 92 are now positioned between the last coil turn 110 and a next-to-last coil turn 116 on the fixed end 68 of the spring 64. The coil spring is automatically centered about the legs 92 so that the coil axis of the coil spring runs therebetween.

The tangential stop arm 100 may be bonded to the stop surface 114 by a suitable adhesive, such as cyanoacrylate or another suitable adhesive. The legs 92 can then be soldered to the fixed end of the coil to provide permanent electrical continuity therebetween.

It has been found that the above-described method for seating the coil spring 64 on an integrated circuit, such as DIP integrated circuit 52 permits precise and repeatable positioning of the coil spring on the IC. This method is extremely rapid and simple, even for unskilled laborers, and reduces the assembly cost of the spring switch 50.

It has also been found that the positioning of the resulting assembly on the electrically conductive inside surface 60 of the face plate 14 is not critical for proper operation of the switch, as is the case with conventional prior art microswitches. As long as the free end 70 of the spring extends, when in the rest position, beyond the arcuate path of the cam second portion 86, then good contact will be made between the free end 70 and electrically conductive inside surface 60. In this case, it has been found that by extending the free end 70 of the spring 64 approximately 0.075 inch beyond the arcuate path traveled by the cam second portion 86, sufficient contact can always be made.

Because the DIP integrated circuit 52 forms the support structure and insulating base for the spring 64, it is possible to directly mount the components of the electronic flasher circuit 40 directly to the electrically conductive inside surface 60 of the face plate 14. This technique eliminates the need for a printed circuit board and most external wiring, as will be more fully described.

Referring to FIG. 7, the electronic flasher circuit 40 includes a DIP integrated circuit 52, as has been previously discussed. Pin 5, the positive supply source pin of the integrated circuit, is connected by an insulated power wire 120 to the positive terminal of a battery supply 122. As shown in FIG. 2, two AAA batteries 124 are connected in parallel by an insulated jumper wire 126 to provide a battery life of up to two years for the simulated alarm system 10.

The fixed end 68 of the coil spring 64 is connected, as has been previously described, to pin 4 of the integrated circuit (which is the negative voltage supply) and pin 3 of the integrated circuit (which is an unconnected pin). Electrical continuity with the negative battery terminal 130 is provided by an uninsulated, nickel-clad wire 132 which is held in compression against the electrically conductive inside surface 60 of the face plate 14 by a conventional D-clip 134. The D-clip is received by grooves 136 in the key lock cylinder housing 26. The D-clip has a curved shape which resiliently holds the key lock cylinder housing 26 between the face plate 14 and a dress nut 138, best seen in FIG. 1. The D-clip also provides electrical continuity between the negative battery terminal 130 and the electrically conductive inside surface 60 of the face plate 14 through the wire 132. Thus, rotation of the cam 80 to the position shown in FIG. 2 causes the free end 70 of the coil spring 64 to wipe against and positively contact the electrically conductive inside surface 60 and complete the circuit shown in FIG. 7.

In applications where it is desirable to insulate the user from the electrical circuit, a lock having a non-conductive cylinder housing should be used. Furthermore, the mounting plate 12 can be manufactured from a non-conductive material, such as plastic, and the portions of the inside surface 60 beneath the wear path 90 need be made conductive. Such a conductive portion can be provided by plating, etching or other processes which are well known to those skilled in the art.

The circuit also has a timing capacitor 140 having a value of approximately 100 microfarads connected directly between pins 2 and 8 without any insulated jumper wires between the capacitor and the respective pins. The capacitor is directly bonded to the electrically conductive inside surface 60 of the face plate 14 as a further step in reducing production costs. The LED 22 is connected between pins 8 and 6 as shown.

The above-described structure and method for assembling the spring switch provide an extremely compact, reliable and inexpensive switch and circuit structure for electronic circuits. Although the spring switch 50 has been described for operation with a simulated alarm system 10, it is to be understood that the spring switch 50 is adaptable to a variety of other applications. For example, it will be well appreciated by those skilled in the art that the spring switch 50 can be applied to any device which requires low clearance and low cost. In the preferred embodiment, the invention provides the security of a key switch with the low clearance of conventional prior art microswitches. Furthermore, the integral spring switch 50 of the present invention, in conjunction with the associated method of circuit assembly, can greatly reduce the cost of many circuits. Further yet, the spring switch assembly 50 can supplant expensive cam-actuated switches which employ conventional microswitches.

Therefore, the invention is not to be limited by the above description, but is to be determined in scope by the claims which follow.

I claim:

1. An apparatus for simulating an alarm system actuating component, comprising:

a rectangular face plate having four sides and a front surface defining an exterior surface and an interior compartment;

a light mounted on the rectangular face plate and having a portion extending through the exterior surface; and self-contained power illumination means, in the interior compartment, for illuminating the light, whereby the appearance of an operating alarm system actuating component is simulated.

2. An apparatus for simulating an alarm system, actuating component, comprising:

a rectangular face plate having four sides and a front surface defining an exterior surface and an interior compartment;

a key operated switch mounted on the face plate;

a light mounted on the face plate; and self-contained power illumination means in the interior compartment and cooperatively associated with the key operated switch, for illuminating the light, whereby the appearance of an operating alarm system actuating component is simulated.

* * * * *